US012277923B2

(12) United States Patent
Choi et al.

(10) Patent No.: US 12,277,923 B2
(45) Date of Patent: Apr. 15, 2025

(54) ELECTRONIC APPARATUS AND CONTROL METHOD THEREOF

(71) Applicant: SAMSUNG ELECTRONICS CO., LTD., Suwon-si (KR)

(72) Inventors: Seungdo Choi, Suwon-si (KR); Kyoungbo Min, Suwon-si (KR); Sooyeon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 17/990,358

(22) Filed: Nov. 18, 2022

(65) Prior Publication Data

US 2023/0230569 A1 Jul. 20, 2023

Related U.S. Application Data

(63) Continuation of application No. PCT/KR2022/015297, filed on Oct. 11, 2022.

(30) Foreign Application Priority Data

Jan. 20, 2022 (KR) ........................ 10-2022-0008513

(51) Int. Cl.
*G10K 11/178* (2006.01)
*H04R 1/10* (2006.01)

(52) U.S. Cl.
CPC ..... *G10K 11/17885* (2018.01); *H04R 1/1083* (2013.01); *G10K 2210/1081* (2013.01); *H04R 2460/01* (2013.01)

(58) Field of Classification Search
CPC ..... G10K 11/17885; G10K 2210/1081; H04R 1/1083; H04R 2460/01
See application file for complete search history.

(56) References Cited

U.S. PATENT DOCUMENTS 10,199,029 B2 2/2019 Hsu et al.
10,313,789 B2 6/2019 Ushakov
(Continued)

FOREIGN PATENT DOCUMENTS

KR 10-2017-0052056 A 5/2017
KR 10-2017-0142001 A 12/2017
(Continued)

OTHER PUBLICATIONS

Written Opinion (PCT/ISA/237) issued Jan. 25, 2023 by the International Searching Authority for International Patent Application No. PCT/KR2022/015297.
(Continued)

*Primary Examiner* — Jason R Kurr
(74) *Attorney, Agent, or Firm* — Sughrue Mion, PLLC

(57) ABSTRACT

An electronic apparatus includes an inner microphone provided on a first surface of the electronic apparatus; an outer microphone disposed on a second surface opposite the first surface; and a processor configured to: receive a voice signal of a counterpart and a voice signal of a wearer of the electronic apparatus that are input through the inner microphone and the outer microphone, based on a size of the voice signal of the wearer input through the inner microphone being greater than or equal to a predetermined threshold, remove the voice signal of the wearer input through the outer microphone based on the voice signal of the wearer input through the inner microphone, and amplify the voice signal of the counterpart input through the outer microphone and from which the voice signal of the wearer is removed and output the amplified voice signal, wherein the size of the voice signal of the wearer input through the inner microphone is greater than a size of the voice signal of the wearer input through the outer microphone.

15 Claims, 6 Drawing Sheets

(56) References Cited

U.S. PATENT DOCUMENTS

| | | | | |
|---|---|---|---|---|
| 10,520,562 | B2 | 12/2019 | Popescu | |
| 11,019,421 | B2 | 5/2021 | Lee et al. | |
| 11,361,785 | B2 * | 6/2022 | Shim | H04R 1/1083 |
| 11,562,763 | B2 | 1/2023 | Lee et al. | |
| 2007/0009122 | A1 * | 1/2007 | Hamacher | H04R 25/453 381/312 |
| 2009/0147966 | A1 * | 6/2009 | McIntosh | H04R 3/005 381/94.1 |
| 2012/0253798 | A1 | 10/2012 | Walters et al. | |
| 2016/0118062 | A1 | 4/2016 | Usher | |
| 2016/0192089 | A1 * | 6/2016 | Merks | H04R 25/407 381/317 |
| 2017/0365247 | A1 | 12/2017 | Ushakov | |
| 2018/0113181 | A1 | 4/2018 | Popescu | |
| 2018/0167715 | A1 | 6/2018 | Graylin et al. | |
| 2019/0043518 | A1 | 2/2019 | Li | |
| 2020/0258539 | A1 | 8/2020 | Shim et al. | |
| 2020/0304936 | A1 | 9/2020 | Chen et al. | |
| 2020/0314526 | A1 | 10/2020 | Lee et al. | |
| 2021/0204053 | A1 | 7/2021 | Kim et al. | |
| 2021/0219051 | A1 | 7/2021 | Goldstein et al. | |
| 2021/0249030 | A1 | 8/2021 | Lee et al. | |
| 2023/0012052 | A1 * | 1/2023 | Monsarrat-Chanon | H04R 1/1016 |

FOREIGN PATENT DOCUMENTS

| | | | |
|---|---|---|---|
| KR | 10-2018-0045853 | A | 5/2018 |
| KR | 10-2018-0138017 | A | 12/2018 |
| KR | 10-2020-0098323 | A | 8/2020 |
| KR | 10-2020-0116323 | A | 10/2020 |
| KR | 10-2021-0101670 | A | 8/2021 |

OTHER PUBLICATIONS

Search Report (PCT/ISA/210) issued Jan. 25, 2023 by the International Searching Authority for International Patent Application No. PCT/KR2022/015297.

Park et al., "GSEP: a Robust Vocal and Accompaniment Separation System Using Gated CBHG Module and Loudness Normalization", Gaudio Lab, Inc., Oct. 2020, (5 pages total).

* cited by examiner

ELECTRONIC APPARATUS AND CONTROL METHOD THEREOF

CROSS-REFERENCE TO RELATED APPLICATIONS

This application is a bypass continuation application of International Application No. PCT/KR2022/015297 designating the United States, filed on Oct. 11, 2022, in the Korean Intellectual Property Receiving Office, which is based on and claims priority to Korean Patent Application No. 10-2022-0008513, filed Jan. 20, 2022, in the Korean Intellectual Property Office, the disclosures of which are incorporated by reference herein in their entireties.

BACKGROUND

1. Field

The disclosure relates to an electronic apparatus and a control method thereof, and, more particularly, to an electronic apparatus that outputs a signal other than noise among input sound signals and a control method thereof.

2. Description of Related Art

With the development of wireless communication technology, electronic apparatuses that communicate in a wired manner are being replaced by electronic apparatuses that communicate in a wireless manner.

Such electronic apparatuses include earphones or headphones. In the past, earphones or headphones were connected to a main device by wire and performed a function of delivering a sound signal output from the main device to a user. However, with the development of communication and electronic technology, wireless earphones or headphones are being commercialized. Active noise cancellation (ANC) technology or the like is applied to earphones or headphones to remove ambient noise and transmit only necessary signals to a wearer. In addition, a function of having a conversation with a counterpart while wearing earphones or headphones is also applied.

When the earphone or headphone delivers a sound signal of content being played to the wearer, the ANC function may operate normally since a difference between the sound being reproduced and the noise coming from the outside is large. However, when transmitting the counterpart's voice signal to the wearer, there is a problem in that it is difficult to distinguish the signal from external noise, such that some of the counterpart's voice signal is also removed.

Accordingly, there is a need for a technology capable of distinguishing a non-noise signal, such as a voice signal of the counterpart, and clearly delivering it to the wearer.

SUMMARY

Provided are an electronic apparatus that clearly transmits a voice signal of the counterpart to a wearer, and a method for controlling thereof.

Additional aspects will be set forth in part in the description which follows and, in part, will be apparent from the description, or may be learned by practice of the presented embodiments.

According to an aspect of the disclosure, an electronic apparatus may include an inner microphone provided on a first surface of the electronic apparatus; an outer microphone disposed on a second surface opposite the first surface; and a processor configured to: receive a voice signal of a counterpart and a voice signal of a wearer of the electronic apparatus that are input through the inner microphone and the outer microphone, based on a size of the voice signal of the wearer input through the inner microphone being greater than or equal to a predetermined threshold, remove the voice signal of the wearer input through the outer microphone based on the voice signal of the wearer input through the inner microphone, and amplify the voice signal of the counterpart input through the outer microphone and from which the voice signal of the wearer is removed and output the amplified voice signal, wherein the size of the voice signal of the wearer input through the inner microphone is greater than a size of the voice signal of the wearer input through the outer microphone.

The processor may be further configured to remove noise included in the voice signal of the counterpart input through the outer microphone and the voice signal of the wearer input through the outer microphone.

The processor may be further configured to perform masking by setting a first frequency domain in which the size of the voice signal of the wearer input through the inner microphone is less than a predetermined threshold value to 0, and setting a second frequency domain in which the size of the voice signal of the wearer input through the inner microphone is equal to or greater than the predetermined threshold value as a value determined based on the predetermined threshold value.

The processor may be further configured to change the predetermined threshold value based on at least one of a predetermined time interval and a predetermined frequency domain.

The processor may be further configured to remove the voice signal of the wearer input through the outer microphone based on the voice signal of the wearer input through the inner microphone on which the masking has been performed.

The processor may be further configured to perform at least one of the masking and the removal of the voice signal of the wearer through the outer microphone based on a learned voice signal processing artificial intelligence neural network model.

The processor may be further configured to equalize the voice signal of the counterpart input through the outer microphone and the voice signal of the wearer input through the outer microphone.

According to an aspect of the disclosure, a method of controlling an electronic apparatus may include receiving a voice signal of a counterpart and a voice signal of a wearer of the electronic apparatus that are input through an inner microphone and an outer microphone, the inner microphone being provided on a first surface of the electronic apparatus and the outer microphone being provided on a second surface opposite the first surface; based on a size of the voice signal of the wearer input through the inner microphone being greater than or equal to a predetermined threshold, removing the voice signal of the wearer input through the outer microphone based on the voice signal of the wearer input through the inner microphone; and amplifying the voice signal of the counterpart input through the outer microphone and from which the voice signal of the wearer is removed and outputting the amplified voice signal, wherein the size of the voice signal of the wearer input through the inner microphone is greater than a size of the voice signal of the wearer input through the outer microphone.

The method may include removing noise included in the voice signal of the counterpart input through the outer microphone and the voice signal of the wearer input through the outer microphone.

The removing of the voice signal of the wearer input through the outer microphone may include performing masking by setting a first frequency domain in which the size of the voice signal of the wearer input through the inner microphone is less than a predetermined threshold value to 0, and setting a second frequency domain in which the size of the voice signal of the wearer input through the inner microphone is equal to or greater than the predetermined threshold value as a value determined based on the predetermined threshold value.

The removing the voice signal of the wearer may include changing the predetermined threshold value based on at least one of a predetermined time interval and a predetermined frequency domain.

The voice signal of the wearer input through the outer microphone may be further removed based on the voice signal of the wearer input through the inner microphone on which the masking has been performed.

The removing the voice signal of the wearer may include performing at least one of the masking and the removing of the voice signal of the wearer input through the outer microphone based on a learned voice signal processing artificial intelligence neural network model.

The method may include equalizing the voice signal of the counterpart and the voice signal of the wearer input through the outer microphone.

According to an aspect of the disclosure, a non-transitory computer-readable storage medium may store instructions that, when executed by at least one processor, cause the at least one processor to receive a voice signal of a counterpart and a voice signal of a wearer of an electronic apparatus that are input through an inner microphone and an outer microphone, the inner microphone being provided on a first surface of the electronic apparatus and the outer microphone being provided on a second surface opposite the first surface; based on a size of the voice signal of the wearer input through the inner microphone being greater than or equal to a predetermined threshold, remove the voice signal of the wearer input through the outer microphone based on the voice signal of the wearer input through the inner microphone; amplify the voice signal of the counterpart input through the outer microphone and from which the voice signal of the wearer is removed and output the amplified voice signal, wherein the size of the voice signal of the wearer input through the inner microphone is greater than a size of the voice signal of the wearer input through the outer microphone.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
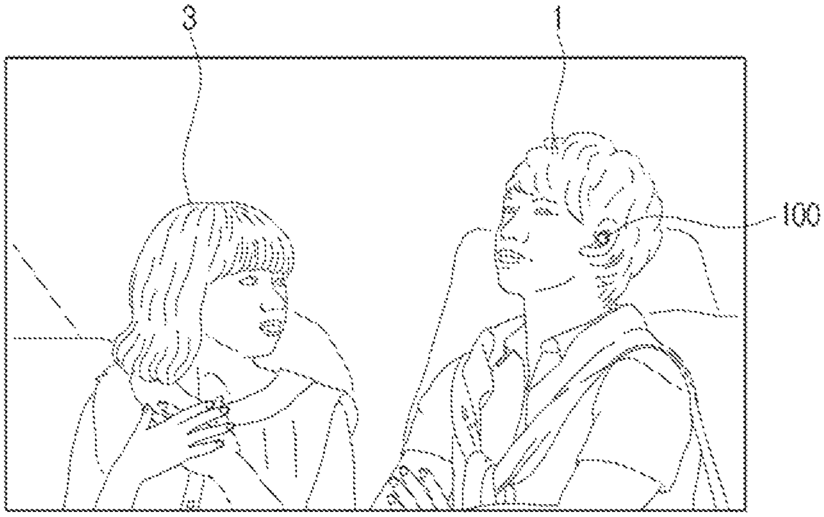
FIG. 1 is a diagram illustrating use of an electronic apparatus according to an embodiment.

Example embodiments will now be described in detail with reference to the accompanying drawings. The embodiments described herein may be variously modified. Certain embodiments may be depicted in the drawings and described in detail in the detailed description. It should be understood, however, that the specific example embodiments illustrated in the accompanying drawings are only intended to facilitate understanding of the various example embodiments. Accordingly, it is to be understood that the technical idea is not limited by the specific example embodiments illustrated in the accompanying drawings, but includes all equivalents or alternatives falling within the spirit and scope of the disclosure.

Terms including ordinals, such as first, second, etc., may be used to describe various elements, but such elements are not limited to the above terms. The above terms are used only for the purpose of distinguishing one component from another.

The expression such as "comprise" or "have" as used herein is intended to designate existence of a characteristic, number, step, operation, element, part or a combination thereof as specified in the description, and should not be construed as foreclosing possible existence or addition of one or more of the other characteristics, numbers, steps, operations, elements, parts or a combination thereof. It is to be understood that when an element is referred to as being "connected" or "accessed" to another element, it may be directly connected or accessed to the other element, but it should be understood that there may be other components in between. When an element is referred to as being "directly connected" or "directly accessed" to another element, it should be understood that there are no other elements in between.

As used herein, a "module" or "unit" for an element performs at least one function or operation. In addition, a "module" or "unit" may perform a function or operation by hardware, software, or a combination of hardware and software. In addition, a plurality of "modules" or a plurality of "units" other than a "module" or "unit" to be performed in specific hardware or to be executed in at least one processor may be integrated into at least one module. Singular forms are intended to include plural forms unless the context clearly indicates otherwise.

In the description of the disclosure, the order of each step should be understood as non-limiting unless a preceding step is to be logically and temporally performed before a subsequent step. In other words, except for exceptional cases described above, even if the process described as a subsequent step is performed before the process described as the preceding step, an essence of the disclosure is not affected, and the scope of the disclosure should also be defined regardless of the order of the steps. In addition, in the disclosure, "A or B" is defined as meaning not only selectively pointing to any one of A and B, but also including both A and B. In addition, in the disclosure, the term "include" has the meaning of encompassing the inclusion of other components in addition to elements listed as being included.

In the disclosure, only essential elements necessary for the description of the disclosure are described, and elements not related to an essence of the disclosure are not described.

In addition, it should not be construed in an exclusive meaning including only the described components, but should be interpreted in a non-exclusive meaning that may also include other elements.

In describing example embodiments, detailed description of relevant known functions or components may be omitted if it would obscure the description of the subject matter. Each embodiment may be implemented or operated independently, but each embodiment may be implemented or operated in combination.

FIG. 1 is a diagram illustrating use of an electronic apparatus according to an embodiment;

Referring to FIG. 1, a wearer 1 wearing an electronic apparatus (e.g., earphone) 100 and a counterpart 3 are illustrated. The electronic apparatus 100 may include a conversation function with the counterpart 3. For example, the electronic apparatus 100 may include a microphone and a speaker. The electronic apparatus 100 may receive a voice signal of the counterpart 3 through a microphone. The electronic apparatus 100 may process an input voice signal of the counterpart 3 and output it through a speaker. Accordingly, the wearer 1 may communicate with the counterpart 3 even while wearing the electronic apparatus 100.

Figure 2:
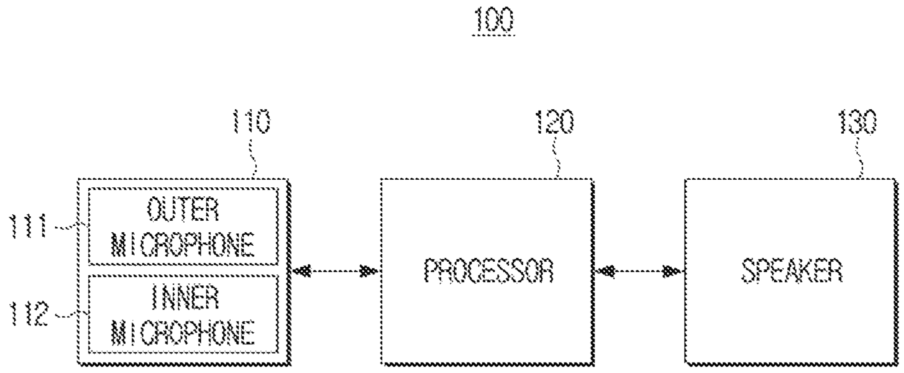
FIG. 2 is a block diagram illustrating a configuration of an electronic apparatus according to an embodiment.

FIG. 2 is a block diagram illustrating a configuration of an electronic apparatus according to an embodiment;

Referring to FIG. 2, the electronic apparatus 100 may include a microphone 110 including an outer microphone 111 and an inner microphone 112, a processor 120, and a speaker 130.

The outer microphone 111 may be disposed on a surface opposite to a surface on which the electronic apparatus 100 is worn by the wearer, and the inner microphone 112 may be disposed on a surface on which the electronic apparatus 100 is worn by the wearer. In other words, when the wearer wears the electronic apparatus 100, the outer microphone 111 may be disposed on the outer surface, and the inner microphone 112 may be disposed on the inner surface. The wearer may talk to the counterpart. Each of the outer microphone 111 and the inner microphone 112 may receive the wearer's voice signal and the counterpart's voice signal.

The processor 120 may control each configuration of the electronic apparatus 100. For example, the processor 120 may control the outer microphone 111 and the inner microphone 112 to receive an external sound signal, and may control the speaker 130 to output a processed sound signal.

In addition, if a size of the wearer's voice signal input through the inner microphone 112 is greater than or equal to a predetermined threshold value, the processor 120 may remove the wearer's voice signal input through the outer microphone 111 based on the wearer's voice signal input through the inner microphone 112. For example, the processor 120 may set a frequency domain in which the size of the wearer's voice signal input through the inner microphone 112 is less than a predetermined threshold value to 0. In addition, the processor 120 may perform a masking process of setting a frequency domain in which the size of the wearer's voice signal input through the inner microphone 112 is equal to or greater than a predetermined threshold value as a value calculated based on the predetermined value. As an embodiment, the processor 120 may change the predetermined value based on a predetermined time interval or a predetermined frequency domain. The processor 120 may remove the wearer's voice signal input through the outer microphone 111 based on the wearer's voice signal input through the inner microphone 112 on which the masking process has been performed.

As an embodiment, the processor 120 may perform a process such as a masking process or a removal process of the wearer's voice signal based on a learned voice signal processing artificial intelligence neural network model. The functions related to artificial intelligence according to the disclosure may be operated through the processor 120. The processor 120 may be composed of one or more processors. In this example, one or the plurality of processors may include, for example, and without limitation, a general-purpose processor such as a central processing unit (CPU), application processor (AP), or a digital signal processor (DSP), a graphics-only processor such as a GPU, a vision processing unit (VPU), or an artificial intelligence-only processor such as an neural processing unit (NPU). One or more processors may control to process input data according to a predefined operation rule or an artificial intelligence model stored in the memory. Alternatively, when one or more processors are artificial intelligence dedicated processors, the artificial intelligence dedicated processor may be designed with a hardware structure specialized for processing a specific artificial intelligence model.

The predefined operation rule or the artificial intelligence model may be characterized by being generated through learning. The feature of being generated though learning means that a basic artificial intelligence model is learned using a plurality of learning data by a learning algorithm, such that the predefined behavioral rule or artificial intelligence model set to perform a desired characteristic (or purpose) is generated. Such learning may be performed in the device itself performing artificial intelligence according to the disclosure, or may be performed through a separate server and/or system. Examples of the learning algorithm include, for example, and without limitation, supervised learning, unsupervised learning, semi-supervised learning, or reinforcement learning, but are not limited to the examples described above.

The artificial intelligence model may include a plurality of neural network layers. Each of the plurality of neural network layers may have a plurality of weight values, and perform a neural network operation through an operation result of a previous layer and a plurality of weights. The plurality of weight values of the plurality of neural network layers may be optimized by the learning result of the artificial intelligence model. For example, the plurality of weight values may be updated to reduce or minimize a loss value or a cost value acquired from the artificial intelligence model during the learning process. The artificial neural network may include, for example, and without limitation, a deep neural network (DNN), such as convolutional neural network (CNN), deep neural network (DNN), recurrent neural network (RNN), restricted Boltzmann machine (RBM), deep belief network (DBN), bidirectional recurrent deep neural network (BRDNN), or deep Q-Networks, or the like, but is not limited to the embodiment described above.

The processor 120 may amplify and output the voice signal of the counterpart from which the wearer's voice signal has been removed among the input sound signals. In addition, the processor 120 may remove noise included in the voice signal of the counterpart input and the voice signal of the wearer through the outer microphone 111. Alternatively, the processor 120 may equalize the counterpart's voice signal and the wearer's voice signal input through the outer microphone 111 to correspond to a predetermined frequency feature. A detailed process of processing the input voice signal by the processor 120 will be described below.

The speaker 130 may output signal-processed sound. The speaker 130 may output a voice signal of the counterpart from which the wearer's voice signal is removed from among the input voice signals under the control of the processor 120.

Figure 3:
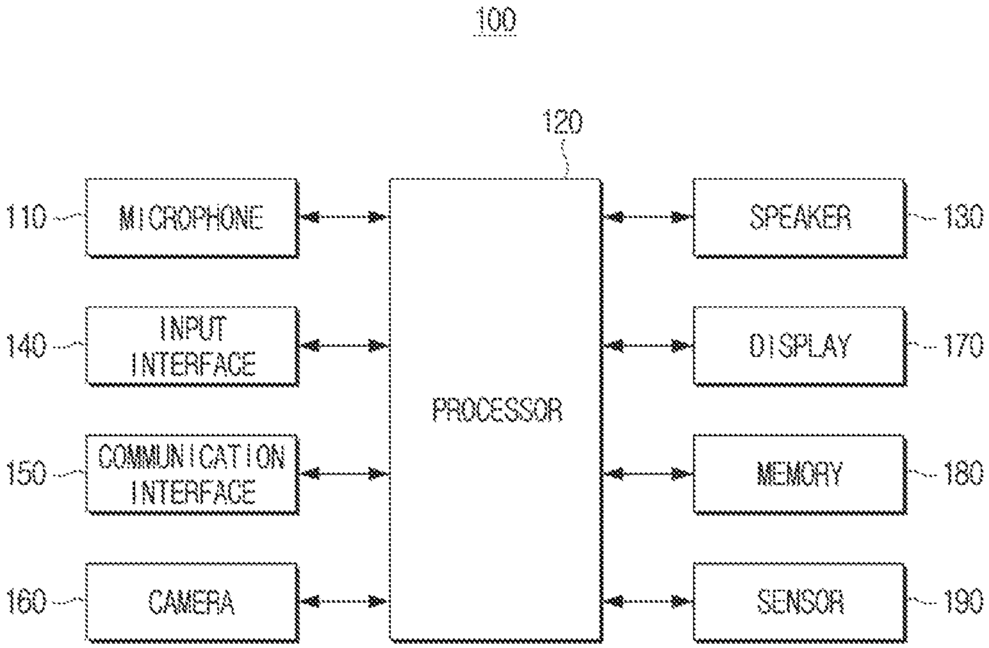
FIG. 3 is a block diagram illustrating a detailed configuration of an electronic apparatus according to an embodiment.

FIG. 3 is a block diagram illustrating a detailed configuration of an electronic apparatus according to an embodiment;

Referring to FIG. 3, the electronic apparatus 100 may include a microphone 110, a processor 120, a speaker 130, an input interface 140, a communication interface 150, a camera 160, a display 170, and a memory 180 and a sensor 190. The microphone 110 may include an outer microphone 111 and an inner microphone 112. Since the microphone 110 and the speaker 130 are the same as those described in FIG. 2, a detailed description thereof will be omitted.

The input interface 160 may receive various user commands. For example, the input interface 140 may be implemented as a button, a key pad, a touch pad, or the like. The input interface 140 may perform a function of receiving a command from the user, and may be referred to as an input device, an input unit, an input module, or the like.

The communication interface 150 communicates with an external device. For example, external devices may include AI speakers, smartphones, tablet PCs, laptop computers, wearable devices, set-top boxes (STBs), optical disc drives (ODDs), video players, game consoles, servers, clouds, or the like. The communication interface 150 may transmit and receive a control signal, a sound signal, or the like with an external device. For example, the communication interface 150 may include a module capable of performing communication in a manner such as third generation (3G), long-term evolution (LTE), fifth generation (5G), Wi-Fi, Bluetooth, digital multimedia broadcasting (DMB), advanced television systems committee (ATSC), digital video broadcasting (DVB), local area network (LAN), or the like. The communication interface 150 for communicating with an external device may be referred to as a communication device, a communicator (e.g., including communication circuitry), a communication module, a transceiver, or the like.

The camera 160 may photograph surrounding environment including the user. The processor 120 may identify an object or a surrounding environment based on the photographed image.

The display 170 may display various information. For example, the display 170 may display status information, setting information, and information related to a sound signal of the electronic apparatus 100. The display 170 may be implemented as a liquid crystal display (LCD), an organic light emitting diode (OLED), a flexible display, a touch screen, or the like. When the display 170 is implemented as a touch screen, the electronic apparatus 100 may receive a control command through the touch screen.

The memory 180 may store data and algorithms that perform functions of the electronic apparatus 100, and may store programs and commands driven in the electronic apparatus 100. In addition, the memory 180 may store the learned voice signal processing artificial intelligence neural network model (or algorithm) or the like. For example, the memory 180 may be implemented as a type of read-only memory (ROM), random access memory (RAM), hard disk drive (HDD), solid state drive (SSD), memory card, or the like.

The sensor 190 may detect a state of the electronic apparatus 100, a surrounding environment, an object, or the user. For example, the sensor 190 may include an image sensor, a motion recognition sensor, a proximity sensor, a thermal sensor, a touch sensor, an infrared sensor, an ultrasonic sensor, a geomagnetic sensor, a gravity sensor, an acceleration sensor, or the like.

The configuration of the electronic apparatus 100 has been described above. Hereinafter, a process in which the electronic apparatus 100 processes a voice signal will be described.

Figure 4:
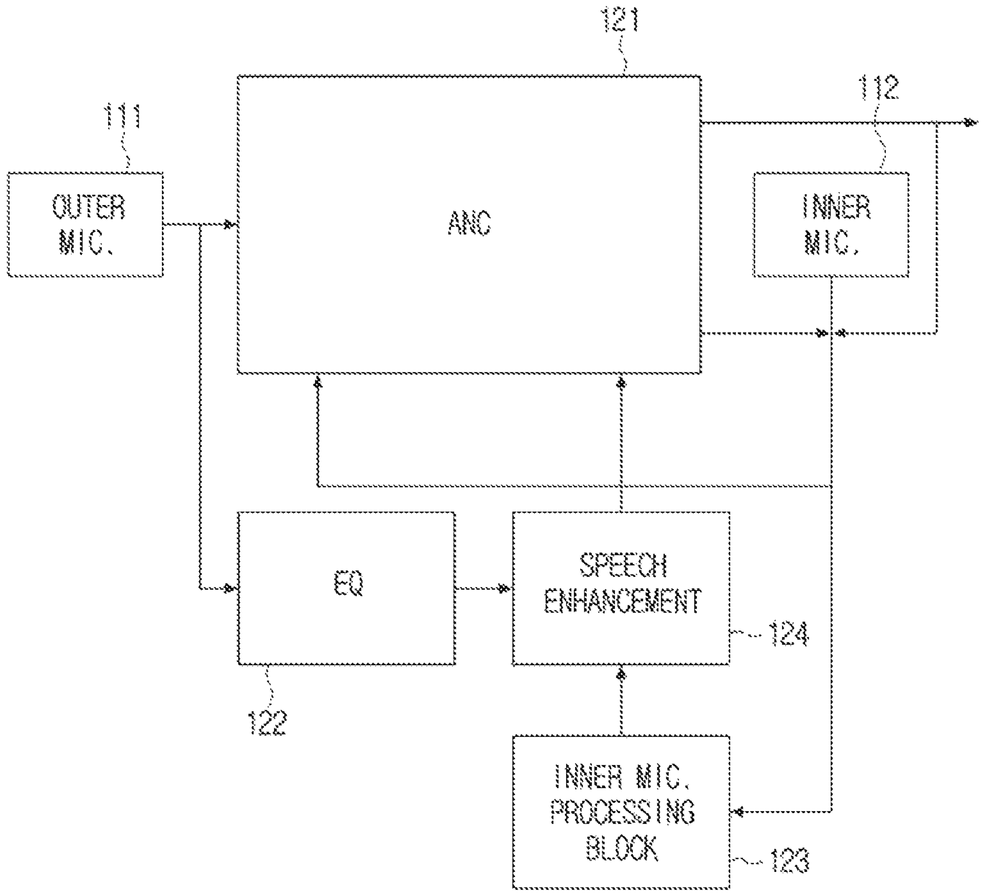
FIG. 4 is a diagram illustrating an operation of an electronic apparatus according to an embodiment.
Figure 5:
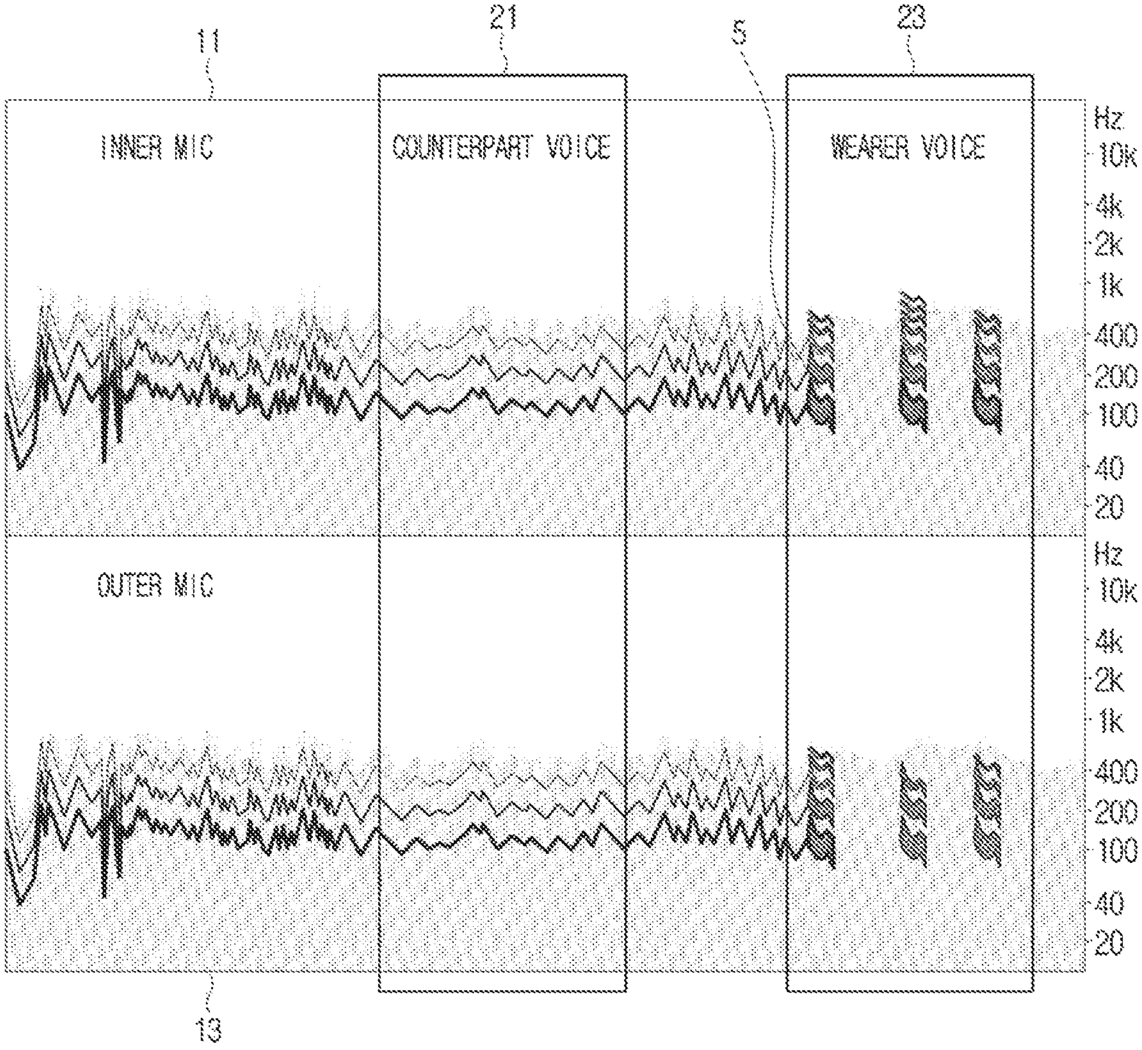
FIG. 5 is a diagram illustrating processing a wearer's voice according to an embodiment.

FIG. 4 is a diagram illustrating an operation of an electronic apparatus according to an embodiment. FIG. 5 is a diagram illustrating processing a wearer's voice according to an embodiment.

Referring to FIG. 4, the microphone 110 may include the outer microphone 111 and the inner microphone 112. In addition, the processor 120 may include an active noise cancellation (ANC) block (or module, circuit, unit) 121, an equalizer (EQ) block 122, an inner microphone processing block 123, and a speech enhancement block 124, or the like.

A wearer wearing the electronic apparatus 100 may communicate with the counterpart. The outer microphone 111 may receive the wearer's voice signal 23 and the counterpart's voice signal 21. The inner microphone 112 may also receive the wearer's voice signal 23 and the counterpart's voice signal 21, simultaneously. For example, if the wearer and the counterpart simultaneously speak, the outer microphone 111 and the inner microphone 112 may receive both of the wearer's voice signal 23 and the counterpart's voice signal 21 at the same time. If the wearer and the counterpart sequentially speak, the outer microphone 111 and the inner microphone 112 may sequentially receive the wearer's voice signal 23 and the counterpart's voice signal 21.

FIG. 5 illustrates a waveform graph 11 of voice signals of the wearer and the counterpart input through the inner microphone 112 and a waveform graph 13 of the voice signals of the wearer and the counterpart input through the outer microphone 111. For example, since both the inner microphone 112 and the outer microphone 111 are adjacent to the wearer, the wearer's voice signal 23 may be input stronger than the counterpart's voice signal 21. In addition, due to a position of the microphone, the counterpart's voice signal 21 input through the outer microphone 111 may be relatively stronger than the counterpart's voice signal 21 input through the inner microphone 112.

A voice signal input to the outer microphone 111 may be transmitted to an ANC block 121 and an EQ block 122. The input voice signal may include noise in addition to the voice signal. The ANC block 121 may remove noise included in the input voice signal.

The EQ block 122 may equalize a transmitted voice signal. For example, the EQ block 122 may increase a size of a voice signal in one specific frequency domain and decrease a size of the voice signal in the other specific frequency domain based on a frequency. Alternatively, the EQ block 122 may block a signal of a specific frequency domain. The EQ block 122 may include a filter corresponding to a frequency band to be blocked or passed based on a specific frequency domain. The EQ block 122 may perform signal processing such that the output voice signal is suitable for the wearer and may be heard naturally by equalizing the transmitted audio signal. The equalized voice signal may be transmitted to the speech enhancement block 124.

A voice signal input to the inner microphone 112 may be transmitted to the inner microphone processing block 123. The inner microphone processing block 123 may identify the wearer's voice signal 23 included in the transmitted voice signal and mask the wearer's voice signal 23. As described above, the electronic apparatus 100 may include a conversation function with the counterpart. In other words, since a purpose of the electronic apparatus 100 is to transmit an externally inputted voice signal to the wearer, the wearer's voice signal 23 is an unnecessary voice signal. Accordingly, the inner microphone processing block 123 may identify an unnecessary wearer's voice signal 23.

As illustrated in FIG. 5, the inner microphone processing block 123 may process the wearer's voice signal 23 input through the inner microphone 112 based on a predetermined threshold value. The inner microphone processing block 123 may identify whether the wearer's voice signal 23 input through the inner microphone 112 is equal to or greater than a predetermined threshold value. The inner microphone processing block 123 may set a value calculated based on the predetermined value when the wearer's voice signal 23 input through the inner microphone 112 is greater than or equal to a predetermined threshold, and perform a masking process of setting it to 0 when the predetermined threshold is less than the predetermined threshold. As an embodiment, the masking process may be performed based on Equation (1).

$$\text{mask}_{t,freq} = \begin{cases} 0 \left( mic_{t,freq}^{inner} < \text{threshold} \right) \\ mic_{t,freq}^{inner} * EQ_{t,freq} \left( mic_{t,freq}^{inner} \geq \text{threshold} \right) \end{cases}$$

$EQ_{t,\ freq}$ may be a predetermined value. In addition, $EQ_{t,\ freq}$ may be changed according to a predetermined time interval and a predetermined frequency domain. Through the process described above, a signal 5 in the frequency domain less than the predetermined threshold value among the voice signals 23 of the wearer may be removed.

A voice signal in which the wearer's voice signal 23 input through the inner microphone 112 is masked may be transmitted to the speech enhancement block 124. In other words, the speech enhancement block 124 may receive a voice signal in which the voice signal input through the equalized outer microphone 111 and the wearer's voice signal 23 are masked. The speech enhancement block 124 may remove the wearer's voice signal based on the voice signal input through the outer microphone 111 and the voice signal in which the wearer's voice signal 23 is masked. As an embodiment, a process of removing the wearer's voice signal may be performed based on Equation (2).

$$\text{NetworkInput}_{t,freq} = \text{mic}_{t,freq}{}^{outer} - \text{mask}_{t,freq} \quad (2)$$

In addition, the speech enhancement block 124 may amplify the counterpart's voice signal 21. As an embodiment, the electronic apparatus 100 may perform a masking process or a wearer's voice signal removal process based on a learned voice signal processing artificial intelligence neural network model.

The wearer's voice signal 23 may be removed and the amplified voice signal may be transmitted to the ANC block. Even if the wearer's voice signal 23 is removed through the inner microphone processing block 123 and the speech enhancement block 124, the wearer's voice signal 23 may not be completely removed. However, the wearer's voice signal component is very small and thus it may resemble general noise. Accordingly, the ANC block 121 may receive the voice signal from which the wearer's voice signal 23 has been removed and remove noise, thereby removing almost all components of the wearer's voice signal. Only the voice signal 21 of the counterpart may be included in the wearer's voice signal component and the noise-removed voice signal. The ANC block 121 may output the voice signal 21 of the counterpart through the speaker.

The electronic apparatus 100 may compute the signal from which the noise component is removed from the ANC block and the signal from which the wearer's voice signal is removed with the voice signal input through the inner microphone 112 and receive feedback. Through the process described above, the electronic apparatus 100 may effectively remove the wearer's voice signal component, and reinforce and output the counterpart's voice signal 21.

Various embodiments of performing voice processing in the electronic apparatus 100 have been described above. Hereinafter, a method of controlling the electronic apparatus 100 will be described.

Figure 6:
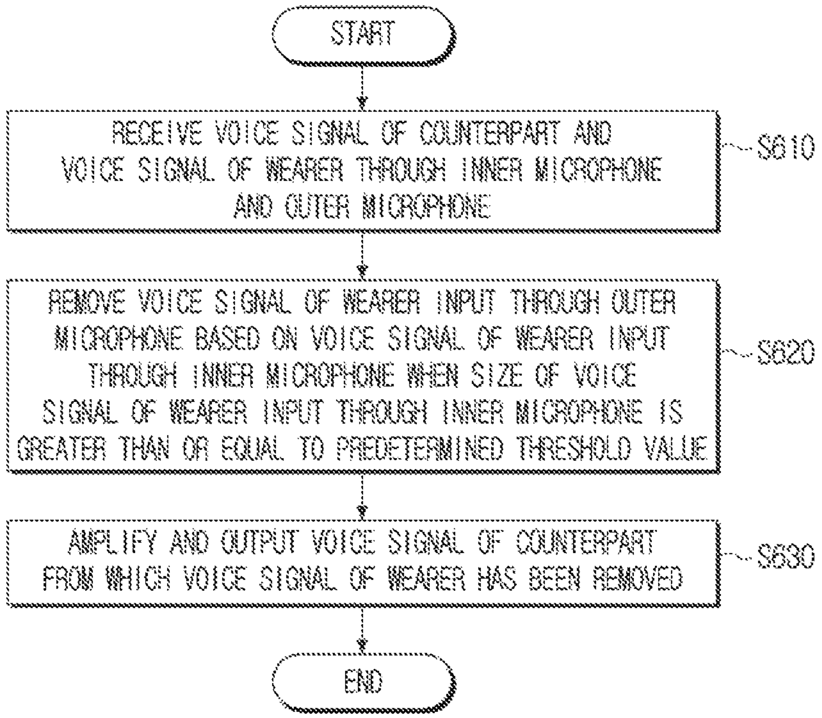
FIG. 6 is a flowchart illustrating a method of controlling an electronic apparatus according to an embodiment.

FIG. 6 is a flowchart illustrating a method of controlling an electronic apparatus according to an embodiment.

Referring to FIG. 6, the electronic apparatus may include an inner microphone disposed on one surface on which the electronic apparatus is worn by the wearer and an outer microphone disposed on an opposite surface of the one surface. In operation S610, the electronic apparatus may receive a voice signal of the counterpart and a voice signal of the wearer through the inner microphone and the outer microphone. A size (or strength) of the wearer's voice signal input through the inner microphone may be greater than a size of the wearer's voice signal input through the outer microphone.

In operation S620, if a size of the wearer's voice signal input through the inner microphone is greater than or equal to a predetermined threshold value, the electronic apparatus may remove the wearer's voice signal input through the outer microphone based on the wearer's voice signal input through the inner microphone. For example, the electronic apparatus may set a frequency domain in which the size of the wearer's voice signal input through the inner microphone is less than a predetermined threshold value to 0. Alternatively, the electronic apparatus may set a frequency domain in which the size of the wearer's voice signal input through the inner microphone is equal to or greater than a predetermined threshold value as a value calculated based on the predetermined value. The above-described process may be a masking process. The electronic apparatus may change the predetermined value based on a predetermined time interval or a predetermined frequency. The electronic apparatus may remove the wearer's voice signal input through the outer microphone based on the wearer's voice signal input through the inner microphone on which the masking process has been performed. As an embodiment, the electronic apparatus may perform a masking process or a wearer's voice signal removal process based on a learned voice signal processing artificial intelligence neural network model.

In operation S630, the electronic apparatus may amplify and output the voice signal of the counterpart from which the wearer's voice signal has been removed. The electronic apparatus may remove noise included in the voice signal of the counterpart input and the voice signal of the wearer through the outer microphone. In addition, the electronic apparatus may equalize the counterpart's voice signal and the wearer's voice signal input through the outer microphone to correspond to a predetermined frequency feature.

The method for controlling the electronic apparatus according to the various embodiments described above may be provided as a computer program product. The computer program product may include a software (S/W) program itself or a non-transitory computer readable medium in which the S/W program is stored.

The non-transitory computer readable recording medium may refer to a medium that stores data and that may be read by devices. For example, the above-described various applications or programs may be stored in the non-transitory computer readable medium, for example, a compact disc (CD), a digital versatile disc (DVD), a hard disc, a Blu-ray disc, a universal serial bus (USB), a memory card, a ROM, or the like, and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
- an inner microphone provided on a first surface of the electronic apparatus;
- an outer microphone disposed on a second surface opposite the first surface; and
- a processor configured to:
  - receive a voice signal of a counterpart and a voice signal of a wearer of the electronic apparatus that are input through the inner microphone and the outer microphone, wherein a size of the voice signal of the wearer input through the inner microphone is greater than a size of the voice signal of the wearer input through the outer microphone,
  - based on the size of the voice signal of the wearer input through the inner microphone being greater than or equal to a predetermined threshold, remove the voice signal of the wearer input through the outer microphone, and
- amplify the voice signal of the counterpart input through the outer microphone and from which the voice signal of the wearer is removed and output the amplified voice signal.

2. The electronic apparatus of claim 1, wherein the processor is further configured to remove noise included in the voice signal of the counterpart and the voice signal of the wearer that are input through the outer microphone.

3. The electronic apparatus of claim 1, wherein the processor is further configured to perform masking by:
- setting a first frequency domain in which the size of the voice signal of the wearer input through the inner microphone is less than a predetermined threshold value to 0, and
- setting a second frequency domain in which the size of the voice signal of the wearer input through the inner microphone is equal to or greater than the predetermined threshold value as a value determined based on the predetermined threshold value.

4. The electronic apparatus of claim 3, wherein the processor is further configured to change the predetermined threshold value based on at least one of a predetermined time interval and a predetermined frequency domain.

5. The electronic apparatus of claim 3, wherein the processor is further configured to remove the voice signal of the wearer input through the outer microphone based on the voice signal of the wearer input through the inner microphone on which the masking has been performed.

6. The electronic apparatus of claim 3, wherein the processor is further configured to perform at least one of the masking and the removal of the voice signal of the wearer input through the outer microphone based on a learned voice signal processing artificial intelligence neural network model.

7. The electronic apparatus of claim 1, wherein the processor is further configured to equalize the voice signal of the counterpart input through the outer microphone and the voice signal of the wearer input through the outer microphone.

8. A method of controlling an electronic apparatus, the method comprising:
- receiving a voice signal of a counterpart and a voice signal of a wearer of the electronic apparatus that are input through an inner microphone and an outer microphone, the inner microphone being provided on a first surface of the electronic apparatus and the outer microphone being provided on a second surface opposite the first surface, wherein a size of the voice signal of the wearer input through the inner microphone is greater than a size of the voice signal of the wearer input through the outer microphone;
- based on the size of the voice signal of the wearer input through the inner microphone being greater than or equal to a predetermined threshold, removing the voice signal of the wearer input through the outer microphone; and
- amplifying the voice signal of the counterpart input through the outer microphone and from which the voice signal of the wearer is removed and outputting the amplified voice signal.

9. The method of claim 8, further comprising removing noise included in the voice signal of the counterpart and the voice signal of the wearer that are input through the outer microphone.

10. The method of claim 8, wherein the removing the voice signal of the wearer input through the outer microphone comprises performing masking by:
- setting a first frequency domain in which the size of the voice signal of the wearer input through the inner microphone is less than a predetermined threshold value to 0, and
- setting a second frequency domain in which the size of the voice signal of the wearer input through the inner microphone is equal to or greater than the predetermined threshold value as a value determined based on the predetermined threshold value.

11. The method of claim 10, wherein the removing the voice signal of the wearer comprises changing the predetermined threshold value based on at least one of a predetermined time interval and a predetermined frequency domain.

12. The method of claim 10, wherein the voice signal of the wearer input through the outer microphone is further removed based on the voice signal of the wearer input through the inner microphone on which the masking has been performed.

13. The method of claim 10, wherein the removing the voice signal of the wearer comprises performing at least one of the masking and the removing of the voice signal of the wearer input through the outer microphone based on a learned voice signal processing artificial intelligence neural network model.

14. The method of claim 8, further comprising equalizing the voice signal of the counterpart and the voice signal of the wearer input through the outer microphone.

15. A non-transitory computer-readable storage medium storing instructions that, when executed by at least one processor, cause the at least one processor to:
- receive a voice signal of a counterpart and a voice signal of a wearer of an electronic apparatus that are input through an inner microphone and an outer microphone, the inner microphone being provided on a first surface of the electronic apparatus and the outer microphone being provided on a second surface opposite the first surface, wherein a size of the voice signal of the wearer input through the inner microphone is greater than a size of the voice signal of the wearer input through the outer microphone;

based on the size of the voice signal of the wearer input through the inner microphone being greater than or equal to a predetermined threshold, remove the voice signal of the wearer input through the outer microphone; and amplify the voice signal of the counterpart input through the outer microphone and from which the voice signal of the wearer is removed and output the amplified voice signal.

* * * * *